Patented Nov. 17, 1953

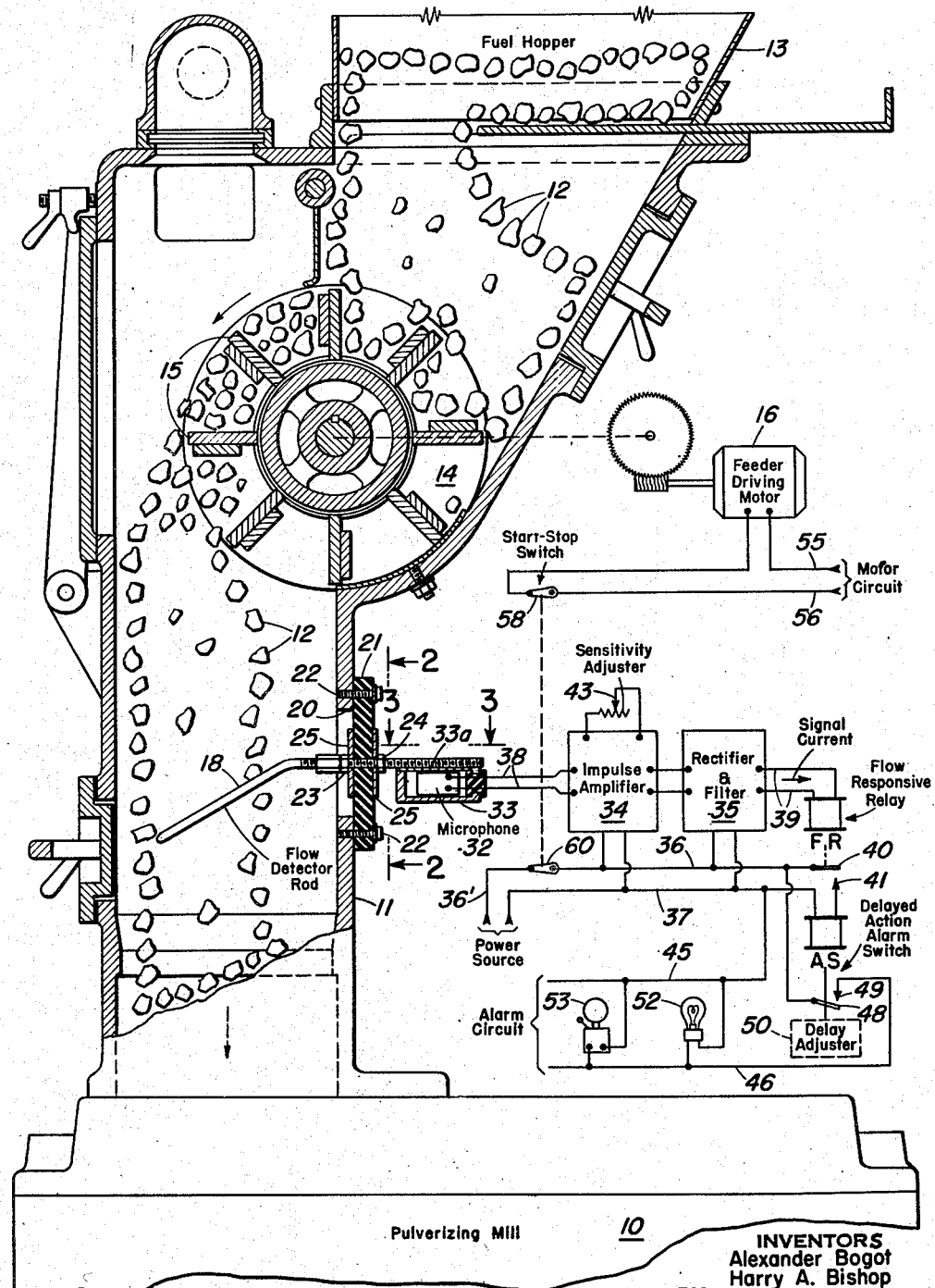
Fig. I.

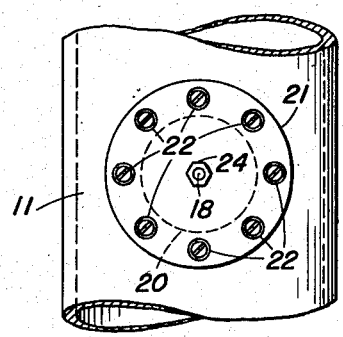
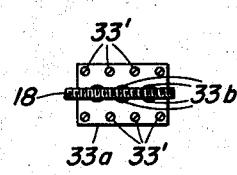
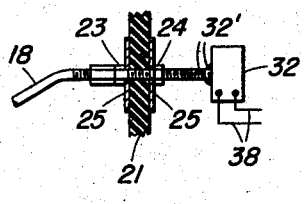
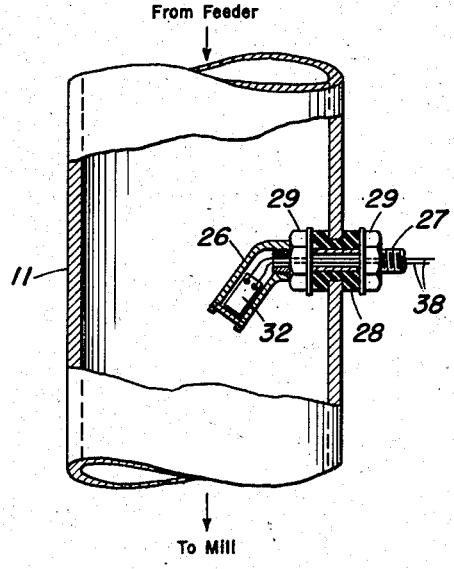
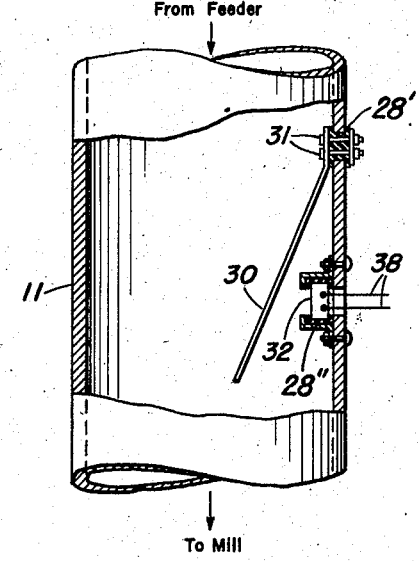

2,659,881

UNITED STATES PATENT OFFICE 2,659,881

DETECTION OF STOPPAGE IN THE FLOW OF DIVIDED MATERIAL

Alexander Bogot, Oak Park, Ill., and Harry A. Bishop, Highland Homes, Va., assignors to Combustion Engineering, Inc., New York, N. Y., a corporation of Delaware Application April 26, 1950, Serial No. 158,212

2 Claims. (Cl. 340—239)

This invention relates to indicating possible stoppages in the flow of divided material and it has particular reference to an improved method of and to novel apparatus for activating an alarm circuit or other device: (a) in response to stoppage in the flow of coal or other fuels or materials through supply conduits to pulverizers or other equipment into which the fuel or material is dispensed by a feeder; and (b) irrespective of whether said stoppage occurs in supply conduits after or ahead of the feeder or in the feeder itself.

One object of this invention is to simplify the construction, reduce the cost and improve the performance of "no-flow alarm" devices of the character stated.

Another object is to simplify the installation and improve the reliability of flow indicator apparatus suitable for service with the coal feeders of pulverizing mills as utilized in power generating stations.

A further object is to render such apparatus free from maintenance difficulty due to friction, sticking or jamming of mechanically movable parts in the material flow conduit.

In practicing this invention we attain the foregoing and other objects by disposing within the conduit supplied by the material feeder a detector member that is physically contacted by the said divided material as same advances past the member, by providing for the detector member a cushioned mounting which allows the aforesaid contact by the moving material to set up vibrations in the member, by disposing a microphone to pick up said vibrations from the detector member and translate same into electrical impulses, by strengthening said impulses in amplifier apparatus that produces from same a signal current which persists in given strength only as long as the divided material continues to flow through the conduit and vibrate the detector member, and by utilizing said signal current to actuate relay means which occupy an inactive position as long as that current continues but which go to an "alarm" position when said current drops off as in response to stoppage of said material flow through the conduit.

Illustrative embodiments of this invention will now be described by reference to the accompanying drawings wherein:

Fig. 1 is a representation partly in section and partly diagrammatic of a fuel feeder for a conventional pulverizing mill supplemented by flow-indicator apparatus uniquely organized in accordance with one preferred form of this invention;

Fig. 2 is a view on line 2—2 of Fig. 1 showing how the gum rubber mounting for the flow detector rod is secured to the conduit wall;

Fig. 3 is a view on line 3—3 of Fig. 1 showing how the projecting end of the detector rod has the sound pick up microphone mechanically affixed thereto.

Fig. 4 illustrates another and somewhat more direct way in which the microphone may be attached to the detector rod end;

Fig. 5 indicates how the microphone and its surrounding case may, if desired, be placed inside the flow conduit for direct contact by the divided material passing therethrough; and Fig. 6 shows a still further arrangement wherein the microphone and a separate sounding plate therefor may be mounted inside the flow conduit without direct mechanical interconnection therebetween.

Illustrative application

The improved "no-flow" indicator of our invention is applicable to any situation wherein divided or grannular material is dispensed by a feeder or otherwise into a conduit through which the material normally flows and wherein it is desired that stoppage of such normal flow will actuate an alarm circuit either to warn an operator or otherwise to initiate appropriate corrective action.

The illustrative application here shown is typical of the foregoing in that the apparatus to be benefited comprises a pulverizing mill on whose top 10 (or on whose side in certain other constructions not shown) there is mounted an incoming conduit 11 which is supplied with coal or other fuel 12 from a hopper 13 through the medium of a conventional feeder 14 equipped with circumferentially spaced radial blades 15 that are slowly rotated (counterclockwise in the drawing) by any suitable means such as an electric driving motor 16.

The inventive apparatus here shown and now to be described is effective to detect stoppage in the resultant normal flow of coal 12 downwardly from feeder 14 through conduit 11 and into pulverizing mill 10, and to activate an alarm circuit or other device if such stoppage persists for a predetermined time. As the description proceeds it will become apparent that our disclosed apparatus is capable of effecting this detection irrespective of whether said stoppage occurs in supply conduits after (as conduit 11) or before (as leading to—not shown—or replacing hopper 13) the feeder 14 or in the feeder itself; also that the "star" feeder illustratively represented at 14 may be replaced by some other form of material dispenser such as one of the "screw" type or the "table" type or the like.

The flow detector member

In order to detect stoppage in said flow there is inserted through one of the walls of conduit 11 a flow detector member 18 shown by Figs. 1—2—3—4 in the form of a small diameter (as of the order of ¼") round stainless steel rod projected as indicated into the downward flow path of the coal 12. The rod mounting is made cushioned or yieldable in order that individual lumps of the fuel in physically contacting the rod 18 can set up therein vibrations which accompany the normal flow of fuel but which cease whenever that flow is stopped.

As here shown such cushioning is achieved by making the opening 20 in the wall of conduit 11 considerably larger (as of the order of 3 inches) than the rod diameter; by covering said opening with a disc 21 of gum rubber or the like held against the surrounding wall face 11 by screws 22; and by extending rod 18 centrally through said rubber disc and securing same thereto by the aid of clamp nuts 23—24 and interposed metal washers 25. Other forms of resilient mounting for detector rod 18 obviously are possible.

The portion of said detector rod 18 that is inside conduit 11 is shown by Fig. 1 as inclining downwardly by about 30° from the horizontal. As the description proceeds it will become evident that said inclination is by no means critical; also that the detector member 18 may take some form other than the rod just described.

Two such alternative forms of detector member construction are respectively shown by Figs. 5 and 6. Fig. 5 indicates how rod 18 of Fig. 1 may be replaced by a microphone casing 26 attached to the inner end of a hollow tube 27 passed through an opening in the wall of conduit 11 and there cushionably supported by a rubber mounting 28 provided with enlarged ends which are compressed by nuts 29 against the wall portion around the opening. When lumps of fuel 12 (see Fig. 1) fall against this casing 26 they cause same to vibrate in the same manner as does rod 18.

Fig. 6 shows the detector member in the form of a thin flat plate 30 of stainless steel fastened only at its upper end, as by bolts 31 and rubber mounting 28', to the inner wall of conduit 11 and inclining inwardly and downwardly therefrom as shown. When lumps of fuel 12 (see Fig. 1) fall against this inclined plate 30 they cause the lower end thereof to vibrate and send out sound waves which are picked up in a manner later to be explained; but when not being struck by such falling lumps the detector plate 30 is by rubber mounting 28' prevented from picking up mill or other unwanted vibrations that may be present in conduit 11.

Vibration responsive microphone

In order to translate the vibrations set up by the flowing fuel 12 in the detector member 18 (or 26 or 30) into electrical impulses use is made of a microphone generally represented at 32. This microphone may satisfactorily be of the "contact" type, although other forms of sound pick up instrument also are useable.

The requirement to be met is that instrument 32 pick up said vibrations in detector member 18 (or 26 or 30) and translate same into electrical impulses capable of being so strengthened in an amplifier 34 that a flow responsive relay FR can be actuated thereby in a manner later to be described. In the arrangement shown by Figs. 1—2—3 said required pick up is achieved by securing the casing 33 of microphone 32 rigidly to the outer end of flow detector rod 18.

Numerous ways of effecting such attachment obviously are possible; that indicated in Figs. 1–3 utilizing a casing cover 33a fixed to the lower side of rod 18's outer end by means of welds 33b (see Fig. 3) and attached by screws 33' (again see Fig. 3) to the top of the casing 33 wherein the microphone 32 is carried in a manner to protect it from dust, dirt and mechanical injury. Should it be desired to dispense with the casing 33, then the microphone 32 may be secured directly to the end of detector rod 18 as shown in Fig. 4 through the medium of welds 32'.

With either arrangement the mechanical vibrations set up in detector rod 18 when the lumps of falling coal 12 strike same are positively transmitted to the microphone 32 with resultant corresponding variations in its internal resistance when of the "contact" type or resultant generation of corresponding electromotive potentials when of the "dynamic" type. In either instance such changes or impulses are communicated by conductors 38 to amplifier 34 wherein they are strengthened and otherwise made suitable for accomplishing such control functions as are desired.

The same action can be made to take place when the microphone 32 is installed inside the flow conduit 11 in the manner shown by Fig. 5. There vibrations imparted by the falling material 12 (see Fig. 1) to the yieldably mounted casing 26 are communicated to the microphone 32 therewithin and converted into electrical impulses which flow to amplifier 34 over conductors 38 that pass out through the center of tube 27 (Fig. 5). Operationally speaking the microphone arrangement of Fig. 5 therefore is generally equivalent to that of Fig. 4 or that of Figs. 1–3.

And in the arrangement of Fig. 6 the same basic action again occurs. Even though the microphone 32 is not mechanically interconnected with detector plate 30, vibrations set up in the latter by pieces of material 12 (see Fig. 1) falling thereagainst are transmitted to the microphone through the air as sound waves. Hence conductors 38 leading from the microphone transmit electrical impulses to the amplifier 34 (see Fig. 1) when and only when fuel or other granular material actually is passing through the conduit 11; at all other times the microphone 32 of Fig. 6 is prevented by a rubber mounting 28" from picking up mill or other unwanted vibrations that may be present in conduit 11.

The amplifier and relay apparatus

In the arrangement here shown the microphone 32 is connected to the input side of an electronic tube amplifier which is powered from any suitable energizing source here represented in the form of conductors 36—37. Since the components of such an amplifier are relatively conventional no attempt to illustrate details is here made. It may however be mentioned that one unit 34 which has proved satisfactory in actual operation utilizes three electronic tubes of well known radio receiver type together with associated transformers, resistors, capacitors and other conventional circuit elements.

In the arrangement illustrated the greatly strengthened impulses from microphone 32 are passed from amplifier 34 into rectifier and filter apparatus 35 which converts said strengthened impulses into a signal current that is impressed upon the winding of flow responsive relay FR earlier mentioned. Since apparatus 35 likewise is conventional, a detailed showing of the included circuits is not considered essential to the present disclosure; instead it will suffice to say that the signal current impressed upon relay FR through conductors 39 persists only as long as flowing material 12 continues to hit detector member 18 (or 26 or 30) in conduit 11 and set up therein the aforesaid vibrations which microphone 32 converts into electrical impulses that when appropriately strengthened by amplifier 34 are applied to rectifier and filter apparatus 35.

As here shown the relay FR energized by the resulting signal current is provided with a contact 40 which is held open by that current during the aforesaid conditions of normal material flow through conduit 11. However when that material flow stops and said signal current ceases to flow through the FR relay winding, contact 40 is allowed to drop into engagement with point 41 and thereby complete for a delayed action alarm switch AS an energizing circuit which will later be described.

It will now have become evident that in order for the alarm system to operate as intended the flow responsive relay FR must be safeguarded against false signal current energization when no falling material 12 hits detector member 18 (or 26 or 30) and said member is thus subjected only to the vibrations set up by pulverizing mill 10 and associated apparatus during operation thereof. By reason of the cushioning rubber mounting 21 (or 28 or 28') such mill vibrations can be transmitted to detector member 18 only in slight degree; however if the resultant weak electrical impulses then set up by microphone 32 were sufficiently strengthened by amplifier 34 it is conceivable that the relay FR could be actuated by such mill vibrations in the absence of normal material flow through the conduit 11.

To safeguard against this undesired false response the amplifier 34 is provided with a sensitivity adjustor indicated at 43. As such adjustors are well known no attempt is made to show full details thereof; instead it will suffice to say that in each installation of the alarm apparatus this control 43 is set by trial and error so that mill vibrations alone can not activate flow responsive relay FR. Once such setting has been made said relay FR is assured of responding in desired manner only to actual flow of material 12 downwardly through conduit 11 into which detector member 18 (or 26 or 30) is projected.

*Delayed action switch and alarm circuit*

In certain situations it might be possible to control an alarm circuit 45—46 by directly including therein the aforesaid contact 40—41 of flow-responsive relay FR. As that relay FR typically is a quick acting device such direct inclusion would result in activation of the alarm circuit even by fuel flow stoppages which are of exceedingly short duration.

In most applications including the mill fuel feeder here illustrated it is preferable that the alarm circuit 45—46 be activated only in response to flow stoppages which persist for some preselected period of time such as several seconds. In order to accomplish this result use may satisfactorily be made of a delayed action alarm switch such as represented at AS.

In the illustrative arrangement here shown the winding of this switch AS is connected to receive (as from power source 36—37) energizing current when and only when flow responsive relay FR closes its contacts 40—41. Hence as long as fuel 12 is dropping through conduit 11 in normal manner alarm switch AS will be deenergized, in which event its contact 48 will occupy the released position shown. Under this condition the alarm circuit 45—46 can receive no energizing current from power source 36—37 over the AS contact point 49.

Said normally released contact 48 of switch AS may have a desired pick up delay imparted thereto in any suitable manner as through the medium of adjustor means represented at 50. Such means may take any one of a well known number of forms such as a dash pot, clock work, electrical storage mechanism or the like. As such devices are all conventional, detailed representation thereof has not been attempted; instead it will suffice to say that in the illustrative arrangement shown adjustor 50 may satisfactorily be chosen to provide for contact 48 a closure delay selectable anywhere within the range of from 0 to 60 seconds.

Preferably moreover the mechanism 50 is so arranged that contact 48 of relay AS is free to move from the closed (horizontal) to the released (open) position without substantial retardation or delay. Assuming that device 50 is set for a pick up delay of 20 seconds, this means that individual stoppages in the flow of fuel 12 through conduit 11 of less than 20 seconds will be ineffective for causing switch AS to activate the alarm circuit 45—46. With such setting the flow stoppage must allow relay FR continually to close contacts 40—41 for more than 20 seconds before switch AS can move contact 48 upwardly into engagement with point 49 and thereby connect the alarm circuit 45—46 with its power source 36—37.

Said alarm switch 45—46 may when so energized be arranged to light a signal lamp 52, or to sound a bell 53 or a warning horn, or to accomplish any other functions that may be desired in the particular installation. Once such alarm warns the operator he may manually shut down the mill or initiate other appropriate corrective actions, or automatic means (not shown) likewise may be activated in response to the detected stoppage of fuel flow through conduit 11.

*Operation of complete alarm system*

The manner in which the complete "no-flow" indicator system of this invention operates will have become more or less apparent from the foregoing description of the component parts included therein. As long as coal 12 or other divided material is falling upon the detector member 18 (or 26 or 30) the resultant vibration of that member causes microphone 32 to produce electrical impulses which are strengthened by amplifier 34, and thereafter converted by apparatus 35 into a signal current which causes flow responsive relay FR to hold contact 40 in the open position shown. Under this condition alarm switch AS is deenergized so that contact 48 thereof keeps the alarm circuit 45—46 disconnected from power source 36—37.

If now the coal flow is stopped detector member 18 (or 26 or 30) is no longer vibrated and the signal current impressed on relay FR falls to such a low value that contact 40 drops into engagement with 41 and connects the winding of alarm switch AS with power source 36—37. This starts pick up of AS switch contact 48 and if the flow stoppage persists for the full delay period set by adjustor 50 contact 48 will engage 49 and connect alarm circuit 45—46 with power source 36—37, thereby indicating (as through devices 52—53) that some corrective action should be taken.

Upon resumption in the fuel flow through conduit 11, relay FR again receives signal current which picks up contact 40 and deenergizes alarm switch AS. Contact 48 of said switch now promptly returns to the released position shown. If the duration of the fuel flow stoppage is less than the pick up time of switch AS, contact 48 will have moved only partly up when relay FR deenergizes the winding of switch AS; and contact 48 of said switch then will quickly drop back to its fully released position without having activated the alarm circuit 45—46.

In the represented application of the alarm system to the fuel conduit 11 that is supplied by feeder 14 it is desirable that the various components of the alarm system apparatus be connected with power source 36'—37 only when the feeder driving motor 16 is being supplied with driving current from the motor's energizing circuit 55—56. Such circuit conventionally includes some kind of a start-stop switch represented in simplified form at 58 and there shown in the "on" position.

The objective just stated may satisfactorily be achieved by equipping the alarm power circuit 36'—37 with a similar switch 60 and interlocking same with the motor switch 58, as indicated by the dotted line. By reason of such interlocking arrangement the supply switch 60 can be closed as shown only when the motor switch 58 likewise is closed. Hence each shut down of feeder driver motor by an opening of switch 58 will be accompanied by disconnection at switch 60 of the alarm apparatus from its power source 36'—37. In the absence of such disconnection stoppage of the feeder 14 would cause the alarm apparatus to call for a corrective action at a time when passage of fuel through conduit 11 is rendered impossible by the inaction of said feeder 14.

*Two or more detectors can be used*

Moreover, with our new system it becomes possible to supplement the single detector element here shown at 18 with one or more additional detector elements (not illustrated) which project into conduit 11 from other directions (preferably at about the same level as element 18) and which are organized so that movement of the material 12 along only one side of the conduit must of necessity activate at least one of said detectors. In such arrangement, each of said additional detector elements will be provided with its own microphone that corresponds to device 32, and all of said microphones will be connected in parallel (as through conductors 62' to the input terminals of amplifier 34.

As long now as any one of these several parallel detectors 18 is contacted by material 12 moving therepast through conduit 11, its associated microphone 32 will feed to amplifier 34 electrical impulses which keep relay FR picked up and thereby maintain alarm circuit 45—46 inactive. But should the material flow through conduit 11 stop completely, all of the parallel detectors will then be quiet and this will cause release of relay FR and activation of the alarm circuit 45—46 in the manner earlier described.

An arrangement of the foregoing parallel-detector type obviously will not be needed in all applications; but it does find utility in special situations, as when the no-flow alarm facilities are applied to a vertical or sloping feed pipe which runs substantially solid with coal. Then there exists the possibility that the fuel may "hang up" across part of the conduit area so that downward movement can occur only along a side of the conduit other than the one on which a single detector 18 may be mounted; and it is in installations such as this that the multiple detector arrangement may be found desirable.

*Summary*

Although the new flow-indicator apparatus of this invention has been disclosed as applied to detect flow stoppage in the coal 12 which is dispensed by a rotary feeder 14 into a conduit 11 leading into a pulverizing mill 10, it will be apparent that such application is illustrative rather than restrictive and that the improved alarm system herein shown may with comparable benefit be utilized in any application wherein divided material of any kind normally flows through a conduit regardless of whether that flow is or is not controlled by a feeder and regardless of to what apparatus or device said normally flowing material is delivered.

From the foregoing it will be seen that our invention is capable of wide application and is susceptible to many uses in addition to the illustrative one here shown and described.

We claim:

1. In apparatus for indicating stoppage in the flow of divided material through a conduit having an opening in the wall thereof, the combination of a centrally apertured disk of resilient material disposed over the opening in the wall of said conduit in substantially coaxial relation therewith and secured to the exterior of said conduit by means of a plurality of circumferentially spaced screws positioned adjacent the periphery thereof, a detector member in the form of an elongated rod snugly fitting within the opening in said disk and having one end projecting into said conduit in the flow path of said divided material to be contacted thereby as the same passes the member, said detector member deriving its support solely from said disk and having means fixedly securing it thereto including clamp nuts threadedly disposed on said rod at either side of said disk and washers of a diameter substantially larger than said clamp nuts but smaller than the opening in said wall positioned between said nuts and said disk and arranged, through proper adjustment of said nuts, to firmly clamp said disk therebetween whereby material contacting said rod will cause the same to vibrate, a microphone arranged to derive its support solely from the other end of said rod and to pick up the vibrations thereof and translate same into electrical impulses, means including an amplifier for strengthening said impulses and producing from same a signal current which persists only as long as said material continues to flow through the conduit and set up the aforesaid vibration of the detector member, a quick-acting flow-responsive relay actuated by said signal current and arranged to have the contacts thereof open when said signal current is flowing therethrough and closed when said signal current ceases to flow therethrough, a second relay having the contacts of said first relay in circuit with the coil thereof and having an adjustable time delay device associated therewith whereby upon closing the contacts of said first relay and consequent energization of the coil of said second relay the normally open contacts of said second relay will close only after elapse of a predetermined period of time, and an alarm circuit activated by closing the contacts of said second relay thereby indicating a stoppage of material flow through said conduit.

2. In a system comprising a feeder effective when driven to dispense material into a conduit which normally passes same therethrough and is provided with an opening in the wall thereof, a motor for driving said feeder, and a switch for effecting energization of said motor when in the "on" position and for stopping said motor when in the "off" position, the combination of no-flow alarm apparatus comprising a centrally apertured disk of resilient material disposed over the opening in the wall of said conduit in substantially coaxial relation therewith and secured to the exterior of said conduit by means of a plurality of circumferentially spaced screws positioned adjacent the periphery thereof, a detector member in the form of an elongated rod snugly fitted within the opening in said disk and having one end projecting into said conduit in the flow path of dispensed material to be contacted thereby as same passes the member, said detector member deriving its support solely from said disk and having means fixedly securing it thereto including clamp nuts threadedly disposed on said rod at either side of said disk and washers of a diameter substantially larger than said clamp nuts but smaller than the opening in said wall positioned between said nuts and said disk and arranged, through proper adjustment of said nuts, to firmly clamp said disk therebetween whereby material contacting said rod will cause the same to vibrate, a microphone arranged to derive its support solely from the other end of said rod and to pick up the vibrations thereof and translate same into electrical impulses, means including an amplifier for strengthening said impulses and producing from same a signal current which persists only as long as said material continues to flow through the conduit and set up the aforesaid vibrations in the detector member, a quick-acting flow-responsive relay actuated by said signal current arranged to have the contacts thereof open when said signal current is flowing therethrough and closed when said signal current ceases to flow therethrough, a second relay having the contacts of said first relay in circuit with the coil thereof and having an adjustable time delay device associated therewith whereby upon closing the contacts of said first relay and consequent energization of the coil of said second relay the normally open contacts of said second relay will close only after a predetermined period of time, an alarm circuit activated by closing the contacts of said second relay thereby indicating a stoppage of material flow through said conduit, and a control switch for said alarm circuit organized to shut same off whenever said feeder-motor switch occupies its aforesaid "off" position.

ALEXANDER BOGOT.
HARRY A. BISHOP.

References Cited in the file of this patent
UNITED STATES PATENTS

| Number | Name | Date |
|---|---|---|
| 2,037,748 | Zahodiakin | Apr. 21, 1936 |
| 2,235,928 | Hardinge | Mar. 25, 1941 |
| 2,561,763 | Waters, et al. | July 24, 1951 |